Jan. 18, 1944.  F. E. ARNDT  2,339,609
MATERIAL SPREADER
Filed April 1, 1941  3 Sheets-Sheet 1
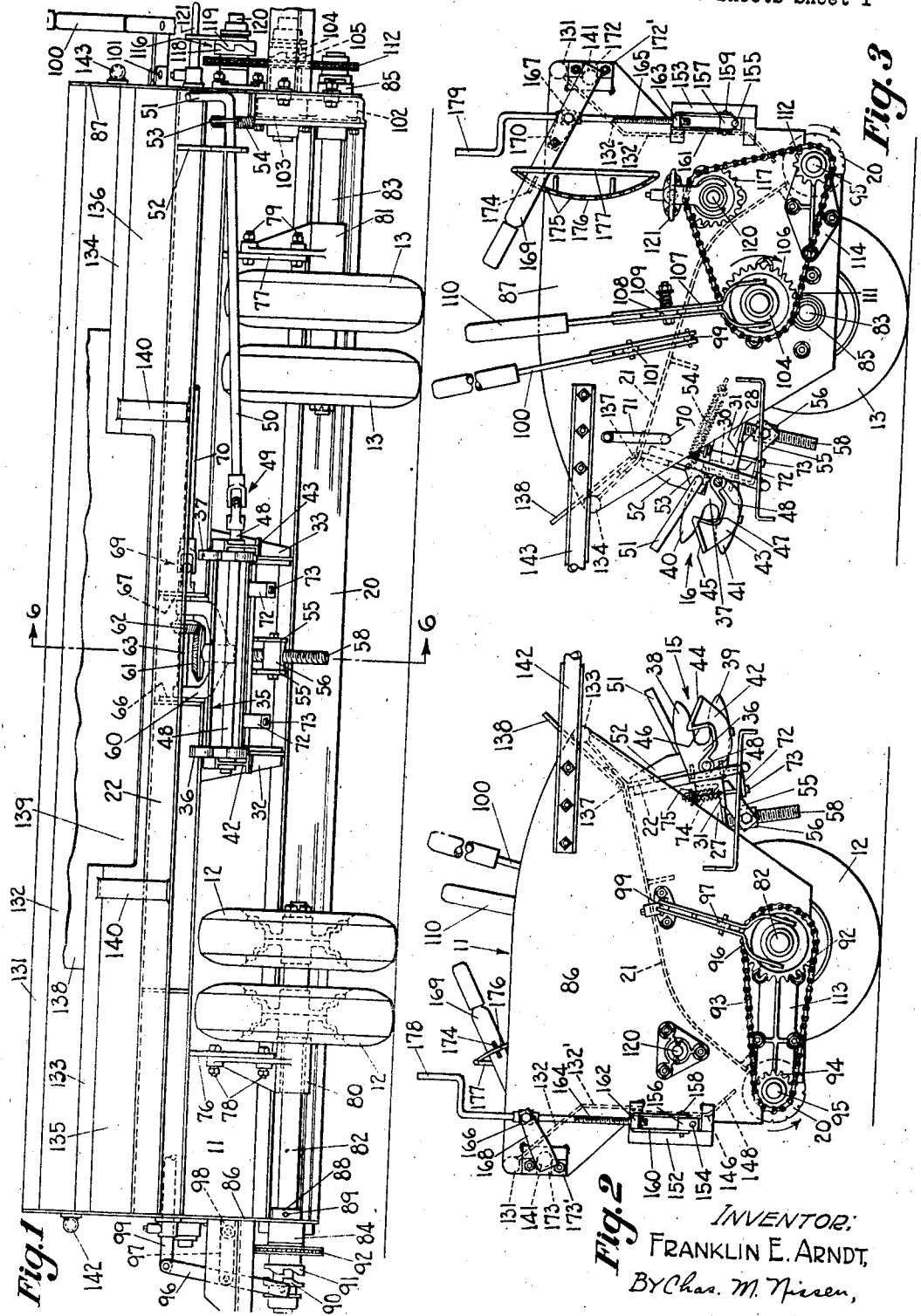
INVENTOR:
FRANKLIN E. ARNDT,
BY Chas. M. Nissen,
ATT'Y Jan. 18, 1944.　　　F. E. ARNDT　　　2,339,609
MATERIAL SPREADER
Filed April 1, 1941　　　3 Sheets-Sheet 2
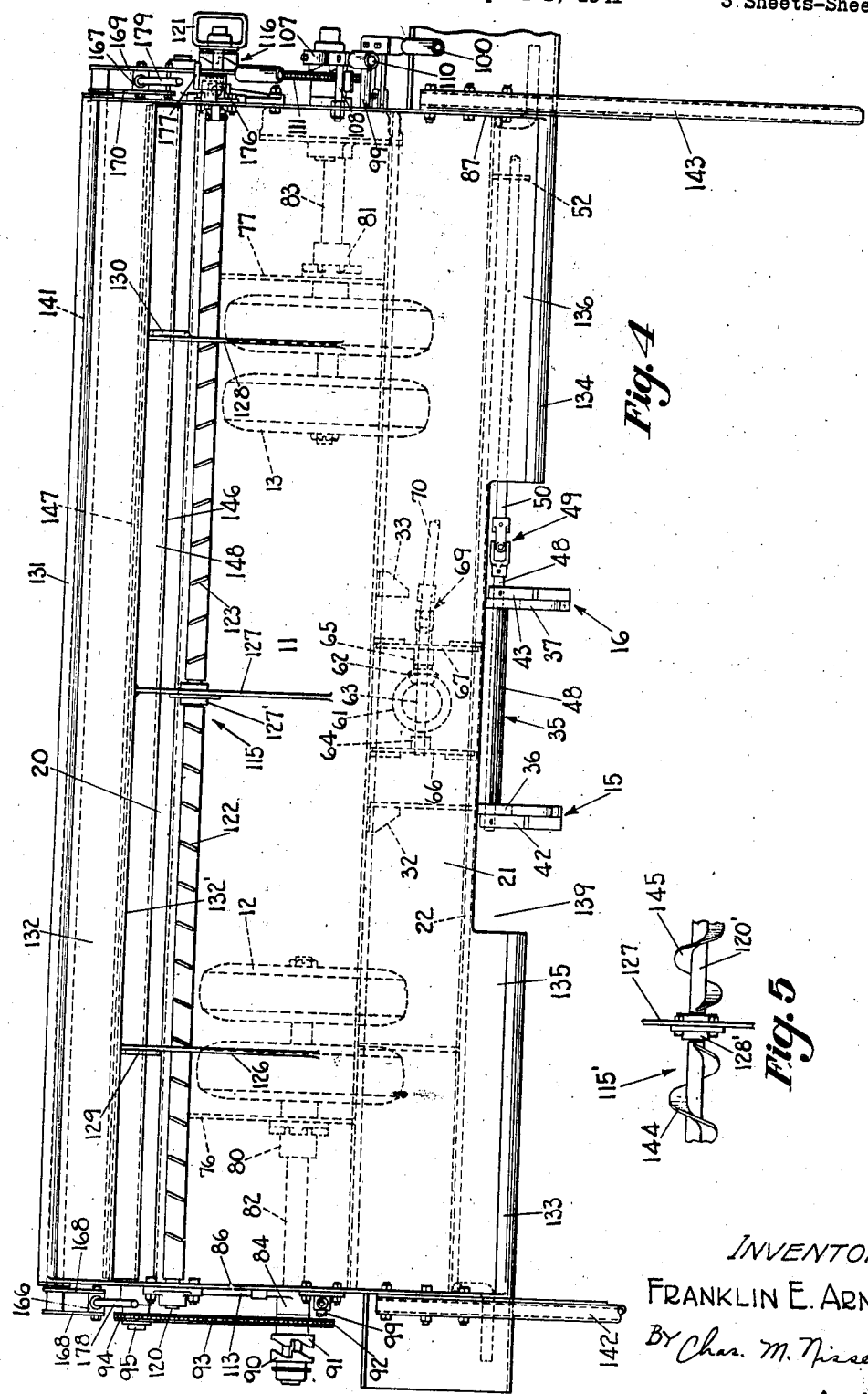
INVENTOR:
FRANKLIN E. ARNDT,
By Chas. M. Nissen,
ATTY.

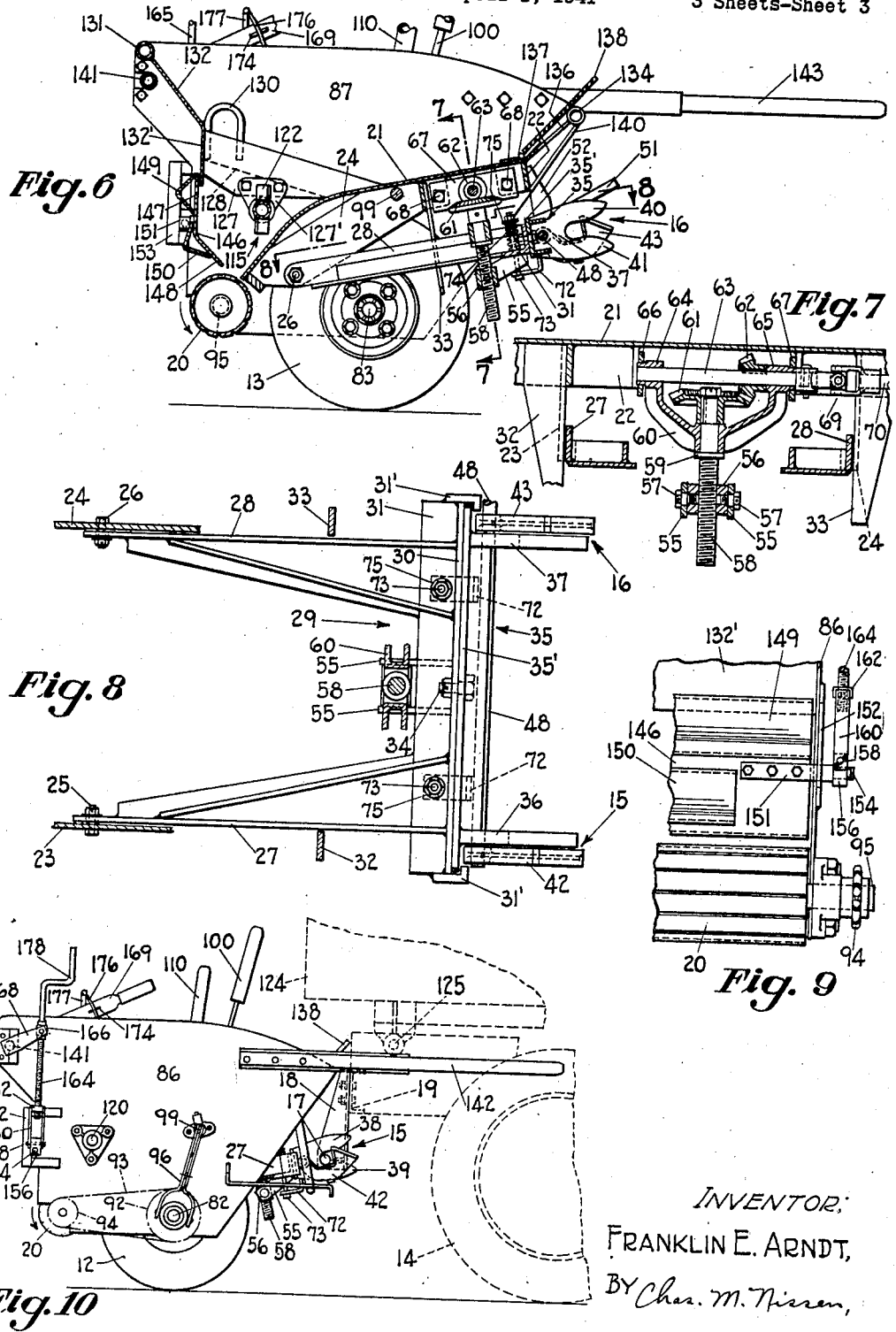

Patented Jan. 18, 1944

2,339,609

UNITED STATES PATENT OFFICE 2,339,609

MATERIAL SPREADER

Franklin E. Arndt, Galion, Ohio, assignor to The Galion Iron Works & Manufacturing Company, a corporation of Ohio Original application June 30, 1939, Serial No. 282,242. Divided and this application April 1, 1941, Serial No. 386,363

10 Claims. (Cl. 221—145)

My invention relates to road material spreaders of the type which is adapted to be hitched to and hauled behind a dumping truck traveling along a roadway, and one of the objects of the invention is the provision of improved valve mechanism and means for adjusting the same from the lateral ends of the hopper of the spreader so as to vary the amount of material delivered from the spreader while traveling along the roadway.

Another object of the invention is the provision of manual means for quickly adjusting a valve approximately to a predetermined position, combined with mechanism for accurately setting the valve at such predetermined position.

A further object of the invention is the provision in combination with valve mechanism of improved and efficient agitating apparatus for a spreader which extends substantially beyond the sides of travel of the draft vehicle to which the spreader is connected.

Another object of the invention is the provision in combination with valve mechanism of improved feeding means adapted to be operated both when the spreader is pulled forwardly and pushed rearwardly along the roadway.

A further object of the invention is the provision of a feed roll and valve mechanism adjustable relative thereto in combination with a rotary agitator in the hopper of a spreader, such agitator having means for conveying toward the lateral ends of the spreader some of the material delivered to the open top of the hopper of the spreader, so as to secure by means of the feed roll a distribution of the spreading of the material in accordance with the adjustment of the valve mechanism.

Other objects of the invention will appear hereinafter, the novel features and combinations being set forth in the appended claims.

This application is a division of my co-pending application, Serial No. 282,242, filed June 30, 1939, now Patent No. 2,309,086 granted January 26, 1943, for an improvement in a Material spreader, as a continuation in part of my co-pending application, Serial No. 131,837, filed March 19, 1937, now Patent No. 2,252,690, granted August 19, 1943, for an improvement in Material spreaders.

In the accompanying drawings,

Fig. 1 is a front elevation of the spreader embodying my improvements;

Fig. 2 is an elevational view of the left-hand end of Fig. 1;

Fig. 3 is an elevational view of the right-hand end of Fig. 1;

Fig. 4 is a plan view of the spreader shown in front elevation in Fig. 1;

Fig. 5 is a detail plan view of the modification comprising oppositely acting spiral conveyors which may be substituted for the oppositely acting paddles of the agitator shown in plan in Fig. 4;

Fig. 6 is a cross-section taken on the line 6—6 of Fig. 1, looking in the direction of the arrows;

Fig. 7 is a sectional view taken on the line 7—7 of Fig. 6, looking in the direction of the arrows;

Fig. 8 is a sectional plan view taken on the line 8—8 of Fig. 6;

Fig. 9 is an enlarged elevation of one end portion of the valve and the parts with which it is associated; and Fig. 10 is a side elevational view of the spreader hitched to a drawbar at the rear end of a self-propelled dumping truck, the rear end of the latter being illustrated diagrammatically in dashed lines.

The hopper 11, as shown in Figs. 1 and 4, is adapted to extend substantially beyond both sides of the draft vehicle or self-propelled hauling dumping truck shown in dashed lines in Fig. 10. The hopper 11, as shown in Figs. 1 and 4, is supported upon the wheels 12, 13 which are set inwardly from the vertical end walls of the hopper so as to track just inside or just outside of the paths of travel of the wheels 14 of the truck shown in dotted lines in Fig. 10. That is to say, when hitching devices 15 and 16 at the front side of the spreader are connected, as shown in Fig. 10, to the drawbar 17 secured by means of the bracket structure 18, 19 to the rear end of the dumping truck, the wheels 12 and 13 of the spreader will travel along paths immediately outside or immediately inside of the paths of travel of the wheels 14 of the dumping truck.

The hopper 11 comprises an open top and an open bottom and below the latter is located the feed roll 20. The bottom wall 21 of the hopper slopes downwardly from the cross-piece 22 to the feed roll 20, as shown in Fig. 6. On the underside of the bottom wall 21 are secured by means of welding, the bracket plates 23, 24 to which are pivoted at 25, 26 the rearwardly extending arms 27, 28 of a U-shaped frame structure 29. This frame structure may comprise various plates welded together into one rigid unit, as shown in Fig. 8, and includes a vertical front cross-piece 30 and a horizontal front cross-piece 31.

Secured to the bottom of the hopper are vertical plates 32 and 33 at opposite sides of the frame structure 29, as shown in Fig. 8. The depending plates 32, 33 act as guiding abutments for the frame structure 29 to confine the latter to upright adjustments on the pivots 25, 26.

Pivoted at 34 to the center of the upright plate 30 is a cross-piece 35, U-shaped in cross-section as shown in Fig. 6. Welded to the ends of the cross-piece 35 are the upright jaw plates 36, 37, each having spaced-apart upper and lower fixed jaws. The jaw plate 36 comprises the upper jaw 38 and the lower jaw 39, as shown in Fig. 2. The jaw plate 37 comprises the upper jaw 40 and the lower jaw 41, as shown in Fig. 3. The jaws 38, 39 and 40, 41 are beveled to facilitate positioning of the drawbar 17, as shown in Fig. 10.

On the outside of the jaw plates 36, 37 are located the beveled latch plates 42, 43, as shown in Figs. 4 and 8. The latch plates 42, 43 are beveled at 44, 45 respectively, as shown in Figs. 2 and 3. The latch plates are also provided with hooking surfaces at 46, 47 in order to hold the drawbar 17 in the locked position shown in Fig. 10.

As shown in Fig. 8, the latch plates 42, 43 are pinned to the rock shaft 48 which is journaled in openings which extend laterally through the jaws plates 36, 37.

As shown in Fig. 1, the rock shaft 48 is connected by means of a universal joint 49 to the actuating rod 50 which is provided with a handle 51 within easy reach of the operator at the right-hand end of the spreader, as viewed in Fig. 1.

Secured to the upper front edge portion of the hopper is a bracket plate 52 provided with an opening for receiving the rod 50 so that the latter may have a journal support to co-operate with the universal joint 49 to support the rod in the position shown in Fig. 1. Secured to the rod 50 is a bracket plate 53 to which is connected a spring 54 the lower end of which is secured below the bottom of the hopper near the right-hand end thereof as viewed in Fig. 1.

It can readily be seen by referring to Fig. 1 that when the rod 50 is rotated by means of the handle 51 in an anti-clockwise direction as viewed by the operator, the latch plates 42, 43 will be moved downwardly into positions to release the drawbar 17 (Fig. 10). When the handle 51 is released, the spring 54 will automatically return the latch plates to the position shown in Figs. 2 and 3. When the hitching devices are at a proper elevation from the road surface, the spreader may be pushed forward so that the beveleded surfaces 44 and 45 of the latch plates will engage the drawbar 17 whereupon the latch plates will be automatically depressed against the action of the spring 54 until the drawbar 17 is in the position shown in Fig. 10, whereupon the spring 54 will snap the latch plates into their locking positions.

When the towing vehicle exerts a pull through the drawbar 17 on the hitching devices, the pivot bolt 34 need not take the entire pulling strain as the latter may be distributed between the bolt 34 and the L-shaped guide plates 31', 31' welded to the ends of the plates 30 and 31 and extended forwardly and inwardly in positions to form abutment guideways for the ends of the plate 35' secured to the back of the cross-piece 35. In other words, the rigid structure comprising the cross-piece 35, the jaw plates 36, 37 and the rear plate 35' may be pivoted at 34 and guided at its ends by the L-shaped plates 31', 31' which also serve as abutments to co-operate with the bolt at 34 to distribute the pull exerted from the hitching devices 15, 16.

In order to enable the drawbar 17 to be secured to the rear end of the dumping truck at fixed elevation relative to the road surface and to save the time necessary to adjust the elevation of the drawbar 17 relative to the road surface, I have provided means for adjusting the elevations of the hitching devices so as to be in accordance with the elevation of the drawbar on the dumping truck. Secured to and depending from the cross-piece 31 of the frame structure 29 are spaced-apart bracket plates 55, 55 between which is swiveled a nut 56, as shown in Figs. 1, 7 and 8. The nut 56 may be swiveled to the plates 55, 55 by means of the cap screws 57, 57 shown in Fig. 7. Threaded through the nut 56 is the upright screw-threaded shaft 58. At the upper end of the screw-threaded portion of the shaft 58 is a collar 59 for supporting the double arm bracket 60. Immediately above the collar 59 the shaft 58 is journaled in the lower end of the bracket 60. To the upper end of the shaft 58 is keyed a bevel gear 61 which meshes with another bevel gear 62 keyed to the shaft 63, the ends of which are journaled in the bearings 64, 65 at the upper end portion of the bracket 60, as shown in Fig. 7.

The upper outer ends of the journal bearings 64, 65 are in turn journaled in openings in the plates 66, 67, as shown in Fig. 7. The plates 66, 67 are rigidly secured to the bottom plate 21 of the hopper and this may be done by means of bolts, as illustrated at 68, 68 in Fig. 6.

By means of a universal joint 69, the shaft 63 is connected to the actuating rod 70. The rod 70 may be extended through an opening in one of the lateral end walls of the hopper to an actuating handle 71 shown in Fig. 3.

When the spreader is to be hitched to the towing truck, the drawbar 17 may not be in parallelism with the rock shaft 48 but such parallelism may be effected since the cross-piece 35 is pivoted at 34 to the front end of the frame structure 29. L-shaped brackets 72, 72 are secured to the underside of the cross-piece 35, as shown in Fig. 6, and these brackets extend rearwardly under the angle iron 30, 31. Bolts 73, 73 extend upwardly through the rearwardly extending portions of the brackets 72 and through openings in the plate 31. Springs 74 surround the bolts and rest on the plate 31 below the washers 75. When the cross-piece 35 is tilted on the pivot 34 one or the other of the springs 74 is compressed and consequently when hitching is effected with the draw-bar 17 and rock shaft 48 out of parallelism, undue strain will not be transmitted to the frame structure 29 or to the hopper structure. Furthermore, the springs 74 always tend to center the cross-piece 35 or hold it in parallelism to the cross-pieces 30, 31. It will also be seen that when the towing truck travels along the roadway and the drawbar 17 tilts transversely thereof, the springs 74 act as shock absorbers between the rear end of the truck and the hopper structure.

Secured to the under side of the hopper are the bracket plates 76, 77, as shown in Fig. 1. Bolted at 78, 79 to the bracket plates 76, 77 are the journal bearings 80, 81 for the inwardly extending supporting wheel shafts 82, 83. The wheels 12 and 13 are keyed to the shafts 82 and 83 to rotate therewith.

The outer ends of the shafts 82 and 83 are journaled in bearings 84, 85 which are secured to the end walls of the elongated hopper. Bearing against the inner wall of the end plate 86 of the hopper is a collar 88 which is secured to the shaft 82 by means of a set screw 89, as shown in Fig. 1.

Splined to the outer end of the shaft 82 is a jaw clutch element 90, as shown in Fig. 1. Associated with the jaw clutch element 90 is a slip clutch element 91 which is loosely journaled on the shaft 82. The slip clutch element 91 is connected to the sprocket 92. As shown in Fig. 2, the sprocket 92 is connected by means of the sprocket chain 93 to the sprocket 94 secured to the shaft 95 of the feed roll 20. A shipper 96 is connected to the jaw clutch 90, as shown in Figs. 1 and 2. Intermediate the ends of the shipper 96 is a pivotally connected link 97 the inner end of which is pivotally connected to a bracket 98 on the outer wall of the hopper end plate 86. To the upper end of the shipper 96 is pivotally connected a rod 99 which is adapted to extend under the bottom plate 21 to the other end of the spreader within easy reach of the operator. As shown in Fig. 3, the rod 99 is pivotally connected to the lower end of a shifting lever 100 which is fulcrumed at 101 to the outer side of the hopper end plate 87.

The right-hand end of the shaft 83, as viewed in Fig. 1, is connected through reversing gearing 102, 103 to a shaft on which is splined a jaw clutch element 104. Associated with this jaw clutch element is a slip clutch element 105 which is connected to the sprocket 106. By means of a shipper 107 connected to the jaw clutch element 104, the latter may be moved into or out of engagement with the slip clutch element 105. The shipper 107 comprises two plates between which extends the fulcrum element 108 on the outer wall of the hopper end plate 87. A spring 109 holds the plate straps of the shipper 107 in frictional engagement with the mounting 108 so that when the operator releases the handle 110, the clutch will remain applied or released.

As shown in Fig. 3, the sprocket 106 is connected by means of the sprocket chain 111 to the sprocket 112 on the feed roll shaft 95. Reinforcing plates 113 and 114, as shown in Figs. 2 and 3, may be used for securely mounting the journal bearings for the roller shaft 95 in desired association with the discharge opening in the bottom of the hopper.

It should be particularly noted that the feed roll 20 always rotates in delivery direction whether the spreader is moved forwardly or rearwardly along the roadway. That is to say, the feed roll 20 always rotates in the direction of the arrow shown in Fig. 3 or in the direction of the arrow shown in Fig. 2, irrespective of the direction of travel of the spreader. When the spreader is pulled forwardly or to the left, as viewed in Fig. 3, the clutch element 104 will be rotated in a clockwise direction as viewed from the right-hand end of Fig. 1. When the handle 110 is moved away from the plate 87, the clutch element 104 engages the jaw clutch 105 and the sprocket 106 will be rotated in the direction of the arrow shown in Fig. 3 and consequently the feed roll 20 will be rotated in a clockwise direction as viewed in Fig. 3.

When the spreader is moved rearwardly with the clutch elements 104 and 105 still in engagement, the clutch element 104 will be automatically slipped off the clutch element 105. Only by throwing in the clutch 90, 91 can the feed roll 20 be rotated when the spreader is moved rearwardly. By moving the lever 100 away from the plate 87, the rod 99 will be pushed to the left as viewed in Fig. 1, and the clutch elements 90, 91 brought into engagement, whereupon the rearward rotation of the wheels 12 will cause anticlockwise movement of the sprocket 92, as viewed in Fig. 2, and this will effect rotation of the feed roll 20 in an anti-clockwise direction as viewed in Fig. 2 or in a clockwise direction as viewed in Fig. 3. It will thus be seen that the feed roll 20 will always be rotated in feeding direction whether the spreader is moved forwardly or rearwardly.

Uniformity of direction of rotation of the feed roll 20 is taken advantage of in securing rotation of the agitator 115 always in the same direction, irrespective of the direction of travel of the spreader along the roadway. Moreover, the slip clutch 116 assures uniformity of rotation of the agitator 115. The sprocket chain 111 is extended around the sprocket 117, as shown in Fig. 3. Connected to the sprocket 117 to rotate therewith is a slip clutch element 118. The jaw clutch element 119 is splined to the shaft 120 of the rotary agitator 115. By means of a loop handle 121, the clutch element 119 may be applied or released.

It will thus be seen that the construction disclosed in the accompanying drawings includes automatic means for compelling rotation of the agitator 115 always in the same direction irrespective of the direction of travel of the spreader along the roadway. The control of the direction of rotation of the feed roll and the control of the direction of rotation of the agitator 115, are taken entirely out of the hands of the operator. No matter what adjustment he might try to make he can not interfere with the predetermined direction of rotation and consequently maximum efficiency of operation is maintained. The act of compulsion is for the benefit of the operator so that he can not make any mistake about the direction of the feed roll or the direction of rotation of the agitator 115. In other words, whether the spreader is traveling forwardly or rearwardly the operator can always be assured that spreading will be effected by actuating the lever 100 or the lever 119 to apply one of the clutches. If one lever will not let its clutch stay in, the other lever 110 will do so. A single operator can give his entire attention to adjustments of the gate and the application of the clutches by means of the levers 100, 110 shown in Fig. 3. He can start or stop rotation of the feed roll 20 and rotation of the agitator 115, but the direction of rotation will always be the same under all circumstances and nothing the operator can do under normal conditions of operation will enable him to make a mistake as to the direction of rotation of the feed roll 20 and the direction of rotation of the agitator 115. The operator is always compelled to let the automatic mechanism take care of the desired direction of rotation of the feed roll 20 and the desired direction of rotation of the agitator 115.

The act of compulsion referred to is automatic to the extent of automatic prevention of reversal of rotation of the agitator 115. Either clutch when effective is automatically released when the direction of travel of the hopper is reversed. The agitator 115 is adapted to spread the material in the hopper to the lateral ends thereof and since this hopper is of extra width the efficiency or effectiveness of such spreading operations is increased not only by the increased width of the spreading of the material on the roadway but also by the saving of time due to the automatic mechanism which takes the control of direction of rotation of the agitator 115 out of the hands of the operator and utterly prevents rotation of the agitator being reversed. The operator is precluded from making any adjustment which would decrease efficiency.

It can readily be seen by referring to Figs. 1 and 3 that since the feed roll 20 always rotates in the same direction, the sprocket 117 will always be rotated in a clockwise direction as viewed from the right-hand end of Fig. 1. Such direction of rotation is desirable because the rotary agitator comprises diagonally extending paddles 122, 123 so distributed and arranged as to convey some of the material from the middle of the hopper toward the outer lateral ends thereof. Such conveying action in opposite directions from the middle of the hopper is desirable, particularly when the hopper is elongated on both sides of the path of travel of the towing truck. The feed roll 20 may therefore be termed an actuator for this purpose. In other words, when the load carrying body 124 is tilted on its pivot 125 (Fig. 10) to dumping position, such body is narrow relative to the transverse length of the hopper. As the material is received from the dumping truck, the spread of such material to the lateral ends of the hopper is greatly facilitated by the conveying action of the rotary agitator.

Inasmuch as the hopper is elongated across the roadway, the rotary agitator 115 is journaled not only in the end plates of the hopper but also in one or more spaced-apart vertical reinforcing plates 126, 127 and 128, as shown in Fig. 4. The vertical reinforcing plates 126, 127 and 128 are welded at their ends to inner walls of the hopper, but it should be particularly noted that these reinforcing plates are shallow in depth and are located intermediate the bottom and top of the hopper. The middle reinforcing plate 127 may have the shape shown in Fig. 6 in full lines and this plate may support the journal bearing 127' for the shaft 120 of the rotary agitator 115. The reinforcing plates 126 and 128 each have the shape indicated by the dotted line in Fig. 6. Therefore, as shown in Figs. 4 and 6, the agitator extends under the plates 126 and 128 and the shaft of the agitator is journaled in the bearing 127' carried by the reinforcing plate 127. U-shaped loops 129 and 130 may be welded to the plates 126 and 128 to form lifting eyes to facilitate assembly or transportation.

Further reinforcement of the hopper may be effected by providing a pipe 131 along the entire length of the rear edge of the hopper, this pipe being welded at its ends to the end plates 86, 87 and also welded along its length to the rear upper edge of the rear inclined wall 132, as shown in Figs. 4 and 6. Reinforcing pipes 133, 134 may be welded to the upper edges of the plates 135 and 136. Hinged at 137, as shown in Fig. 6, is a sheet 138 of flexible material, such as rubber, to close the open space afforded by the cut-away portion 139 of Fig. 4. Near such cut-away portion additional support for the pipes 133 and 134 may be afforded by plate supports, shown at 140 in Figs. 1 and 6.

Handle bars 142 and 143 are connected to the front portions of the end plates 86, 87 to extend forwardly along opposite sides of the dumping truck, as shown in Fig. 10. Even after hitching has been effected, as shown in Fig. 10, the screw shaft 58 may be rotated so as to tilt the hopper on the axis of the wheels 12, 13. By referring to Fig. 6, it will be seen that if the hitching mechanism remains at fixed relation by reason of the drawbar 17 of Fig. 10 being at fixed elevation, operation of the screw shaft 58 will tilt the hopper and therefore vary the elevation of the feed roll 20. However, the main purpose of the mechanism for adjusting the elevation of the hitching mechanism is to accommodate the hitching mechanism to whatever height the drawbar of the towing truck may be, and in this way maintain the upper open side of the hopper approximately horizontal for maximum capacity when receiving material from the dumping truck.

Fig. 5 shows a modified agitator 115' comprising a shaft 120' with spiral blades 144 and 145. The journal bearing 128' for the shaft 120' may be attached to the center reinforcing plate 127. When the agitator 115' is rotated in a clockwise direction, as viewed from the right-hand end of Fig. 5, the spiral blades 144 and 145 will convey material in opposite directions away from the plate 127 and therefore toward the end plates 86, 87 of the hopper.

I will now describe the mechanism for adjusting the rate of feed from end to end of the feed roll. The valve plate or feed gate 146 is located directly above the feed roll 20, as shown in Fig. 6, and extends over the full length of the feed roll between the end plates 86, 87 of the hopper. The valve plate has a vertical portion 147 and an inwardly inclined portion 148, as shown in Fig. 6. The vertical portion 147 is reinforced by having welded thereto an angle plate 149, and the inwardly inclined portion 148 is reinforced by the angle plate 150 which may have one edge welded to the bottom of the inclined portion and the other edge welded to the vertical portion 147. The vertical portion 147 overlaps the outer lower edge of the vertical wall 132' which extends downwardly from the inclined wall 132 of the hopper.

Secured rigidly to the ends of the valve plate 146 are outwardly projecting bars 151. These bars extend through brackets 152 and 153 mounted on the rear edges of the hopper plates 86, 87 to form slots or vertical guideways. Pins 154 and 155 extend outwardly from the ends of the bars 151 through blocks 156 and 157 which in turn are pivoted at 158, 159 respectively to lifting straps 160 and 161, as shown in Figs. 2 and 3. At the upper ends of the straps 160 and 161 are nuts 162, 163 through which are threaded the vertical rods 164, 165, the shafts of which are journaled at 166 and 167 to levers or arms 168, 168 and 169, 170, which in turn are rigidly connected to the rock shaft 141, as shown in Fig. 4.

The journal bearing 167 is pivotally mounted between the arm 170 and the lever 169. The arm 170 is fixed at its right-hand end as viewed in Fig. 3, to the rock shaft 141. The arm 170 extends radially from the rock shaft 141 in parallelism with the lever 169.

The lower fulcrum end of the lever 169 is rigidly connected to one end of the rock shaft 141 which is journaled and held in the slot 172 in the end plate 87 by the keeper 172'. The opposite end of the rock shaft 141 is journaled and held in the slot 173 in the plate 86 by the keeper 173' and is rigidly attached to the arms 168, 168. Between the arms 168, 168 at their free ends is pivotally supported the journal bearing 166, as shown in Figs. 2 and 4.

It will thus be seen that when the lever 169 is lifted or lowered from the right-hand end of the spreader, as viewed in Figs. 1, 3 and 4, both ends of the valve plate 146 are lifted or lowered equally relative to the feed roll 20.

The lever 169 is provided with an inwardly extending latch 174 which is adapted to fit in any of the notches 175 of the arcuate plate 176 secured to the hopper plate 87, as shown in Fig. 3. The lever 169 extends between the guide rod 177 and the arcuate notched plate 176.

After equal adjustment has been made of both ends of the valve plate relative to the feed roll 20 by quick movement of the lever 169, the valve plate may be held in such adjusted position by the latch fitting in one of the notches 175. More accurate adjustment, however, may be made by means of the screw shafts 164 and 165 at the opposite ends of the spreader, either to secure uniform feed over the entire length of the feed roll or to secure greater feed from one end portion of the feed roll than from the other end portion thereof. By means of the handles 178 and 179, as shown in Figs. 2 and 3, the ends of the valve plate may be lifted or lowered individually and therefore one end or the other of the valve plate may be moved farther away or closer to the feed roll. After the adjustment of the valve plate has been made in inclination or parallelism relative to the feed roll, the valve plate as a whole may be lifted or lowered by means of the lever 169 from the right-hand end of the spreader, as viewed in Fig. 1. For instance, the valve plate may be adjusted so that the feed may be greater on one side of the road than on the other, and then the quantity of feed may be regulated by actuating only the lever 169 without further actuation of either of the handles 178, 179.

It should be understood that while the rock shaft 141 fits into the slots 172 and 173 in the end plates 87 and 86, respectively, as shown in Figs. 2 and 3, the keeper plates 172' and 173' are bolted to the plates 87 and 86, respectively, and consequently such keeper plates form journal bearings for the ends of the shaft 141 and the axis of the latter is fixed relative to the hopper. When the lever 169 is moved up or down the journal bearings 166, 167 move in parallel arcs on the shaft 141 as a center. The journal bearings 166, 167 are swiveled to the arms 168, 168 and 169, 170, respectively, and the straps 160, 161 are pivoted at 154, 155, respectively and therefore the rods 164, 165 may sway back and forth as the lever 169 is swung up and down. The pivots 154, 155, 158, 159 constitute universal joints.

The adjustment of the lower edge of the gate 146 relative to the feed roll may be indicated by observation of the gate adjusting mechanism mounted on the outer surfaces of the plates 86 and 87. The brackets 152 and 153 form positive limits to the lowering and raising of the straps 160 and 161 and consequently of the end portions of the gate 146. Although Figs. 2 and 3 show the gate 146 near its lowermost limit at both ends it should be understood that the extension 148 may have its lower edge brought into contact or nearly so with the feed roll 20 when the blocks 156, 157 are at their lowermost limits. By turning the handle 178 the block 156 may be lifted to such point as indicates the maximum desired distance between the gate extension 148 and the feed roll 20. In like manner by turning the handle 179 the height of the block 157 may be adjusted to indicate the desired maximum distance between the gate extension 148 and the feed roll 20 near the plate 87. Then by moving the lever 169 down from the position shown in Fig. 3, the distance between the gate 146 as a whole from the feed roll may be indicated by the notch 175 where the latch 174 is located. The actuation of the lever 169 operates to lift and lower both ends of the gate simultaneously and equally. The adjustment of the end portions of the gate at different distances from the feed roll is desirable for road crowning purposes. For instance, it may be desired to spread a layer of material which shall increase in depth gradually from the center of the roadway to either side thereof adjacent the shoulder or berm. However, when desired, equal adjustments of the end portions of the gate from the feed roll will secure the spreading of a layer of material of equal depth throughout.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a material spreader, the combination with a hopper having a discharge opening in its bottom, of a gate associated with a wall of the hopper and itself forming a continuation of such wall to the discharge opening, a feed roll in such discharge opening in association with said gate, an extension from said gate through a guideway at the adjacent end wall of the hopper, a nut pivotally connected to said extension, a manually rotatable screw-threaded rod threaded into said nut, a journal bearing for said rod, and means for indicating the extent of the opening effected by the actuating of said gate relative to said feed roll.

2. In a material spreader, the combination with a hopper with the lower portion of the rear wall of the hopper vertical, of a feed roll associated with a discharge opening in the hopper, a gate comprising a plate with its rear upper portion vertical and its lower forward portion inclined forwardly and downwardly toward said feed roll, mechanism at the ends of the hopper for vertically guiding the vertical portion of said gate to maintain the same in parallelism to the vertical portion of the rear wall, and means connected to the ends of the gate at the ends of the hopper for vertically adjusting the gate relative to said feed roll.

3. In a material spreader, the combination with a hopper having a discharge opening, of a gate associated with such opening, means for guiding said gate along a vertical wall of the hopper to enable itself to form a downward continuation of such wall to said discharge opening, mechanisms comprising nut and screw elements mounted on the lateral end walls of the hopper and connected to the ends of the gate to enable each end of the gate from the corresponding end of the hopper to be adjusted in elevation without affecting the adjustment in elevation of the other end of the gate, and means comprising a rock shaft connecting said independent adjusting mechanisms for effecting from one end of the hopper the elevation of both ends of the gate simultaneously.

4. In a material spreader, the combination with a hopper having a discharge opening, of a gate associated with said opening, means for guiding said gate relatively to said hopper for adjustment in elevation of each end thereof independently of the other end, a rock shaft extending longitudinally from one end of said hopper to the other end thereof, arms secured to said rock shaft at the ends of said hopper, two lifting devices one individual to each of said arms, one connected between one arm and one end of said gate and the other connected between the other arm and the other end of said gate, each lifting device comprising a rotary rod connected by nut and screw elements to one end of the gate, and a handle connected to one of said arms and to said rock shaft to enable an operator to rock said shaft to effect simultaneous adjustment in elevation of both ends of the gate, individual and independent adjustment in elevation of the ends of the gate being effected by means of the said lifting devices connected thereto.

5. In a material spreader, the combination with a hopper having a discharge opening therein, of a gate associated with such opening, a rock shaft extending longitudinally of said hopper from one end to the other, an arm secured to one end of said shaft and extending radially therefrom at one end of said hopper, a rotary crank rod suspended from said arm, nut and screw elements at the lower end of said rod, means comprising a universal joint connecting said nut and screw elements to one end of said gate, a lever secured to the other end of said rock shaft at the other end of said hopper, an additional crank rod suspended from said lever, nut and screw elements at the lower end of said additional crank rod, means comprising a universal joint for connecting said last-named nut and screw elements to the adjacent end of said gate, and latch means between the hopper and the said lever to hold the latter in adjusted position.

6. In a material spreader, the combination with a hopper, of a feed roll associated with a discharge opening in said hopper, a gate associated with said feed roll, mechanism between the ends of the gate and the ends of the hopper for guiding the said gate for up and down movements relatively to the hopper, actuating mechanism comprising nut and screw elements and a universal joint connected to one end of said gate to adjust the elevation thereof relative to the feed roll, actuating mechanism comprising additional nut and screw elements and another universal joint connected to the other end of the gate to adjust such other end in elevation relative to the feed roll, and arms pivoted to said hopper and connected to said actuating mechanisms to operate the latter, the construction and arrangement being such that said universal joints facilitate tilting of the gate endwise and the swinging of said actuating mechanisms by means of said pivoted arms.

7. In a material spreader, the combination with a hopper, of a feed roll associated with a discharge opening in said hopper, a gate associated with said feed roll, blocks pivoted to the ends of said gate on axes extending longitudinally of the latter, two pairs of straps one pair pivotally connected to each of said blocks on an axis extending transversely of the adjacent longitudinal axis, lifting nuts one connected to each pair of straps, and means comprising screw-threaded rods associated with said nuts for effecting adjustment of the elevation of the gate relative to the feed roll.

8. In a material spreader, the combination with a hopper having a discharge opening therein, of a gate extending longitudinally with such opening, a rock shaft extending longitudinally of the hopper from one end to the other, an arm secured to one end of said shaft and extending radially therefrom at one end of the hopper, a rotary crank rod suspended from said arm, nut and screw elements at the lower end of said rod, means connecting said nut and screw elements to one end of said gate, a lever secured to the other end of said rock shaft and extending radially therefrom at the other end of the hopper, an additional crank rod suspended from said lever, nut and screw elements at the lower end of said additional crank rod, means for connecting said last-named nut and screw elements to the adjacent end of the gate, and latch means between the hopper and said lever for holding the latter in adjusted position.

9. In a material spreader, the combination with a hopper having a discharge opening, of a gate associated with said opening, lifting nuts one connected to one end of said gate and the other connected to the other end thereof, upright manually rotatable rods each having its lower depending portion threaded downwardly one through one of said nuts and the other through the other nut, journal bearings one for each of said rods, a rock shaft extending along the length of said hopper, arms permanently secured to said rock shaft and extending radially therefrom, and connections between said arms and said journal bearings, the construction and arrangement being such that by rocking said shaft by actuating one of said arms at one end of the hopper both ends of the gate may be quickly lifted or lowered along vertical lines approximately to any one of a plurality of predetermined positions and then either end of the gate may be accurately adjusted to a selected predetermined position by rotating the adjacent rod.

10. In a material spreader, the combination with a hopper having a discharge opening, of a gate associated with said opening, vertical manually rotatable rods one at one end of the hopper and the other at the other end thereof, nut and screw elements connecting said rods to the ends of said gate, journal bearings one for each of said rods, a rock shaft extending from one end of the spreader to the other end thereof, arms permanently secured to said rock shaft at the ends of the spreader and extending radially from said rock shaft, and connections between said arms and said journal bearings, said shaft upon being rocked enabling said arms and said connectoins to said journal bearings to effect lifting and lowering of the entire gate along upright lines, said rods upon rotation effecting lifting and lowering of only the adjacent end of the gate, the construction and arrangement being such that by rocking said shaft the gate may be quickly moved approximately to any one of a plurality of predetermined positions and then accurately adjusted at either end by rotation of the adjacent rod.

FRANKLIN E. ARNDT.